United States Patent
Sato et al.

(10) Patent No.: US 9,252,550 B2
(45) Date of Patent: Feb. 2, 2016

(54) ELECTRODE TERMINAL CONNECTOR PRODUCING METHOD

(71) Applicant: Hitachi Cable, Ltd., Tokyo (JP)

(72) Inventors: Takumi Sato, Hitachi (JP); Toshiyuki Horikoshi, Mito (JP); Kotaro Tanaka, Naka-gun (JP); Kenichi Murakami, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 166 days.

(21) Appl. No.: 13/892,111

(22) Filed: May 10, 2013

(65) Prior Publication Data

US 2014/0182129 A1 Jul. 3, 2014

(30) Foreign Application Priority Data

Dec. 28, 2012 (JP) .................... 2012-287849
Dec. 28, 2012 (JP) .................... 2012-287850
Feb. 22, 2013 (JP) .................... 2013-032760
Feb. 22, 2013 (JP) .................... 2013-032761

(51) Int. Cl.
| | |
|---|---|
| H01R 43/20 | (2006.01) |
| H01R 43/16 | (2006.01) |
| H01M 2/20 | (2006.01) |
| H01R 4/10 | (2006.01) |
| H01R 4/62 | (2006.01) |

(52) U.S. Cl.
CPC .............. *H01R 43/16* (2013.01); *H01M 2/20* (2013.01); *H01R 4/10* (2013.01); *H01R 4/62* (2013.01); *Y10T 29/49208* (2013.01)

(58) Field of Classification Search
CPC .............. Y10T 29/49204; Y10T 29/49208; H01R 43/16

USPC ........................................... 29/876, 874
See application file for complete search history.

(56) References Cited

U.S. PATENT DOCUMENTS

| | | | | |
|---|---|---|---|---|
| 6,156,452 | A * | 12/2000 | Kozuki et al. ................. | 429/211 |
| 7,714,230 | B2 * | 5/2010 | Beulque .................... | 174/117 A |
| 2001/0049054 | A1 * | 12/2001 | Enomoto et al. ............. | 429/158 |
| 2010/0248029 | A1 * | 9/2010 | Butt et al. ..................... | 429/211 |
| 2013/0012079 | A1 * | 1/2013 | Sakae et al. .................. | 439/884 |
| 2013/0130572 | A1 * | 5/2013 | Sakae .......................... | 439/884 |

FOREIGN PATENT DOCUMENTS

| | | |
|---|---|---|
| EP | 2581966 A1 | 4/2013 |
| JP | 2011-210482 A | 10/2011 |
| JP | 2012-089254 A | 5/2012 |

* cited by examiner

*Primary Examiner* — David Angwin
(74) *Attorney, Agent, or Firm* — McGinn IP Law Group, PLLC

(57) ABSTRACT

A method is for producing an electrode terminal connector for electrically connecting together a positive terminal and a negative terminal of mutually dissimilar metals. The method includes pressing a first plate of a similar metal to the positive terminal to form a mounting hole in the first plate, pressing a second plate of a similar metal to the negative terminal to form a metallic member which is larger in diameter than the mounting hole, and inserting the metallic member into the mounting hole by press fitting to join the first plate and the metallic member together. The method further includes providing the metallic member with an intervening layer of metal having an ionization tendency between an ionization tendency of metal constituting the first plate and an ionization tendency of metal constituting the second plate, and the first plate and the metallic member are joined together via the intervening layer.

16 Claims, 3 Drawing Sheets

ELECTRODE TERMINAL CONNECTOR PRODUCING METHOD

The present application is based on Japanese patent application No. 2012-287849 filed on Dec. 28, 2012, No. 2012-287850 filed on Dec. 28, 2012, No. 2013-032760 filed on Feb. 22, 2013 and No. 2013-032761 filed on Feb. 22, 2013, the entire contents of which are incorporated herein by reference.

BACKGROUND OF THE INVENTION

1. Field of the Invention

The present invention relates to a method for producing an electrode terminal connector for electrically connecting together positive and negative terminals formed of mutually dissimilar metals.

2. Description of the Related Art

In recent years, non-aqueous electrolyte secondary batteries represented by lithium ion secondary batteries have increasingly been put into practical use. The non-aqueous electrolyte secondary batteries have a high energy output per unit volume (or unit mass) in comparison with other batteries such as lead acid batteries and the like, and are therefore expected to be applied to power storage systems utilizing renewable energy for mobile communication devices, laptops, electric vehicles, hybrid vehicles, and solar batteries and the like.

Such non-aqueous electrolyte secondary batteries have an electrode group structured as a stack of positive and negative electrodes with a separator placed therebetween, a case for receiving the electrode group, and an electrolyte solution enclosed in the case.

The positive electrode uses aluminum as its base material, while the negative electrode uses copper as its base material. The positive electrode is electrically connected with a positive terminal made of aluminum or an aluminum alloy, while the negative electrode is electrically connected with a negative terminal made of copper or a copper alloy.

In low-power small-size devices, these non-aqueous electrolyte secondary batteries are used solely, but for large-size devices requiring high power, single-battery power thereof is naturally insufficient and therefore a plurality of non-aqueous electrolyte secondary batteries are connected in series and parallel to produce desired power.

In this case, it is necessary to electrically connect the positive and negative terminals together, and as previously mentioned, the positive and negative terminals are formed of the mutually dissimilar metals respectively, and therefore the dissimilar metals need to be joined together. Joining the dissimilar metals together causes concerns of joint corrosion and resistance increasing due to a local battery effect arising from a difference in ionization tendency between the metals.

Also, for joining per se, resistance welding, which is used as a general way to join the metals together, makes a stable joint strength difficult to achieve, due to a difference between respective melting points of the metals.

For example, JP-A-2011-210482 discloses an electrode terminal connector comprising a positive electrode connecting portion, which is connectable with a positive terminal, and a negative electrode connecting portion, which is connectable with a negative terminal, wherein the positive electrode connecting portion and the negative electrode connecting portion are arranged in such a manner that a perimeter of the positive electrode connecting portion is surrounded by the negative electrode connecting portion, or a perimeter of the negative electrode connecting portion is surrounded by the positive electrode connecting portion, and wherein the positive electrode connecting portion and the negative electrode connecting portion are integrally bonded together by metallic bonding.

Also, JP-A-2012-89254 discloses an electrode terminal connector comprising an electrode joined to one electrode terminal and formed of a similar metal to that electrode terminal, and a bus bar connected to the electrode and formed of a similar metal to the other electrode terminal, wherein the electrode and the bus bar are integral together by diffusion bonding.

These electrode terminal connectors allow the joining of the electrode terminal connector and the electrode terminal to be the joining of the similar metals, therefore, in principle, preventing the occurrence of corrosion and resistance increasing due to the local battery effect, and also permitting the employment of resistance welding or the like as the way to join the metals together.

Refer to JP-A-2011-210482 and JP-A-2012-89254, for example.

SUMMARY OF THE INVENTION

Now, the electrode terminal connectors disclosed by JP-A-2011-210482 and JP-A-2012-89254 are produced by hydrostatic extrusion to bond the dissimilar metals together to form an intermediate product, followed by cutting of that intermediate product into a plate shape of the electrode terminal connectors.

Achieving the hydrostatic extrusion requires large-scale equipment, and also the cutting of the intermediate product into the plate shape requires a long time and produces chip wastes, therefore being likely to significantly increase production cost.

JP-A-2012-89254 also discloses that the electrode terminal connector is produced by forming a mounting hole in a plate material, followed by a press fit of a metallic member formed of a dissimilar metal into the mounting hole. But, before the press fit of the metallic member into the mounting hole, an oxide film is likely to grow over the surface of the aluminum or aluminum alloy, leading to no sufficient joint strength between the dissimilar metals.

Accordingly, it is an object of the present invention to provide an electrode terminal connector producing method, which requires no large-scale equipment, and which allows a short time from mounting hole formation until metallic member joining, and which can suppress oxide film growth to achieve a sufficient joint strength between dissimilar metals.
(1) According to a feature of the invention, a method for producing an electrode terminal connector for electrically connecting together a positive terminal and a negative terminal formed of mutually dissimilar metals respectively, comprises the steps of:

pressing a first plate formed of a similar metal to the positive terminal to form a mounting hole in the first plate;

pressing a second plate formed of a similar metal to the negative terminal to form a metallic member which is larger in diameter than the mounting hole; and inserting the metallic member into the mounting hole by press fitting to join the first plate and the metallic member together, in which the steps are continuously performed by a pressing device.
(2) According to another feature of the invention, a method for producing an electrode terminal connector for electrically connecting together a positive terminal and a negative terminal formed of mutually dissimilar metals respectively, comprises the steps of:

pressing a first plate formed of a similar metal to the negative terminal to form a mounting hole in the first plate;

pressing a second plate formed of a similar metal to the positive terminal to form a metallic member which is larger in diameter than the mounting hole; and inserting the metallic member into the mounting hole by press fitting to join the first plate and the metallic member together, in which the steps are continuously performed by a pressing device.

The method of (1) or (2) may further comprise:

providing the metallic member with an intervening layer comprising a metal having an ionization tendency between an ionization tendency of a metal constituting the first plate and an ionization tendency of a metal constituting the second plate, in which the first plate and the metallic member are joined together via the intervening layer as a boundary.

In the feature (1), the following modifications and changes can be made.

(i) The method may further comprise, after joining the first plate and the metallic member together, heating under an inert atmosphere.

(ii) The method may further comprises pressing the first plate to form a positive terminal fixing hole therein; and pressing a center region of the metallic member to form a negative terminal fixing hole therein so that the metallic member remains around an inner portion of the mounting hole.

In another feature (2), the following modifications and changes can be made.

(i) The method may further comprise, after joining the first plate and the metallic member together, heating under an inert atmosphere.

(ii) The method may further comprises pressing the first plate to form a negative terminal fixing hole therein; and pressing a center region of the metallic member to form a positive terminal fixing hole therein so that the metallic member remains around an inner portion of the mounting hole.

Points of the Invention

According to the embodiments of the invention, it is possible to provide the electrode terminal connector producing method, which requires no large-scale equipment, and which allows a short time from the mounting hole formation until the metallic member joining, and which can suppress oxide film growth to achieve a sufficient joint strength between the dissimilar metals.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1A:
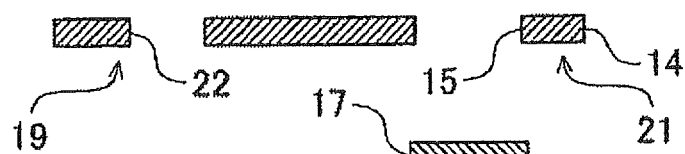
FIGS. 1A to 1E are explanatory diagrams showing an electrode terminal connector producing method in the first embodiment according to the invention.

Next, preferred embodiments according to the invention will be described in conjunction with the accompanying drawings.

First Embodiment

As shown in FIGS. 1A to 1E and 2, an electrode terminal connector producing method in this embodiment is a method for producing an electrode terminal connector 13 for electrically connecting together a positive terminal 11 and a negative terminal 12 formed of mutually dissimilar metals. The method comprises the steps of pressing a first plate 14 formed of a similar metal to the positive terminal 11 to form a mounting hole 15 in the first plate 14; pressing a second plate (not shown) formed of a similar metal to the negative terminal 12 to form a metallic member 17 which is larger in diameter than the mounting hole 15; and inserting the metallic member 17 into the mounting hole 15 by press fitting to join the first plate 14 and the metallic member 17 together, wherein the steps are continuously performed by a pressing device.

The positive terminal 11 and the negative terminal 12 are each provided in such a manner as to extend from a plurality of non-aqueous electrolyte secondary batteries 18. The positive terminal 11 is formed of aluminum or an aluminum alloy, while the negative terminal 12 is formed of copper or a copper alloy.

The plurality of non-aqueous electrolyte secondary batteries 18 are connected in series and parallel via the electrode terminal connector 13 to constitute a battery system to be mounted to power an electric vehicle or hybrid vehicle, for example.

In order to electrically connect together the positive and negative terminals 11 and 12 formed of the mutually dissimilar metals, the electrode terminal connector 13 is equipped with a positive terminal connecting portion 19 to be electrically connected with the positive terminal 11, and a negative terminal connecting portion 21 to be electrically connected with the negative terminal 12.

The positive terminal connecting portion 19 is formed with a positive terminal fixing hole 22 therein for the positive terminal 11 to be inserted therein and fixed by resistance welding or the like, while the negative terminal connecting portion 21 is formed with a negative terminal fixing hole 23 therein for the negative terminal 12 to be inserted therein and fixed by resistance welding or the like.

Here, each of the steps is specifically described.

In the step of pressing the first plate 14 formed of a similar metal to the positive terminal 11 to form the mounting hole 15 in the first plate 14, the first plate 14 formed of aluminum or an aluminum alloy is pressed (especially, punched) to form the mounting hole 15, and form the positive terminal fixing hole 22, resulting in the positive terminal connecting portion 19 (see FIG. 1A). Immediately after this step, no oxide film is formed around an inner surface of the mounting hole 15.

In the step of pressing the second plate formed of a similar metal to the negative terminal 12 to form the metallic member 17 which is larger in diameter than the mounting hole 15, the second plate formed of copper or a copper alloy is pressed (esp. punched) to form the metallic member 17. Since the second plate is substantially the same in thickness as the first plate 14, the thickness of the metallic member 17 is also substantially the same as the thickness of the first plate 14.

Figure 1B:
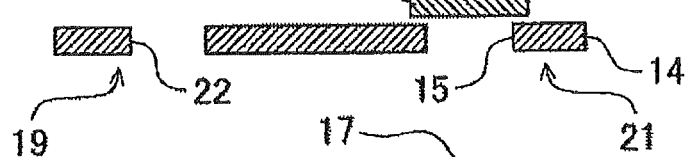
Figure 1C:
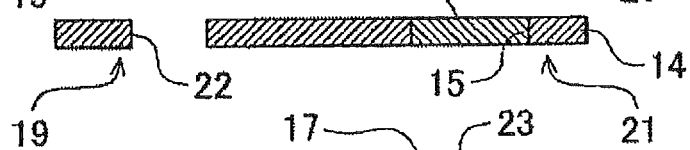
Figure 1D:
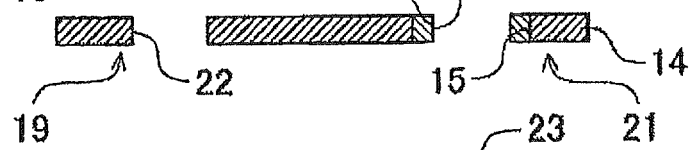

In the step of inserting the metallic member 17 into the mounting hole 15 by press fitting or indentation to join the first plate 14 and the metallic member 17 together, the metallic member 17 is press fitted in the mounting hole 15 by punching of the pressing device (see FIGS. 1B and 1C).

At this point, the metallic member 17 and the mounting hole 15 contact with each other so that surfaces of the metallic member 17 and the mounting hole 15 mutually scrape or grind while plastically deforming, thereby the metallic member 17 is pressed into the mounting hole 15. Consequently, even if a little oxide film forms around the inner surface of the mounting hole 15, the oxide film is destroyed immediately before the joining, and new surface creation is furthered, resulting in diffusion bonding of the aluminum or aluminum alloy of the first plate 14 and the copper or copper alloy of the metallic member 17.

This results in joining together of the dissimilar metals, aluminum or aluminum alloy of the first plate 14 and copper or copper alloy of the metallic member 17. This joining is the diffusion bonding with the two different metal surfaces metallurgically integral together in a solid phase state, therefore allowing enhancement of joining reliability and prevention of corrosion and resistance increasing due to the local battery effect.

Because the pressing process is fast in comparison with other working methods, continuously performing these steps with the pressing device allows the performing the formation of the mounting hole 15 through the joining of the metallic member 17 in a short period of time. Accordingly, it is possible to perform the joining while minimalizing the growth of an aluminum based oxide film. It is known that the aluminum based oxide film is formed on a surface of aluminum or aluminum alloy and is very stable once formed, so that the aluminum based oxide film does not disappear even after the diffusion bonding by annealing. Further, even if a little oxide film is formed, the bonding by the press fitting will result in furthering new surface creation to achieve a sufficient joint strength between the dissimilar metals.

Incidentally, in order to continuously perform these steps with the pressing device, for example, the steps may be separated for each working stage (base frame), and each working stage may be switched with the progress of the steps with a conveyor.

The steps are followed by pressing (especially, punching) of the metallic member 17 joined into the mounting hole 14 to form the negative terminal fixing hole 23. It results in the negative terminal connecting portion 21 (see FIG. 1D).

At this point, the negative terminal fixing hole 23 is formed in a center region of the metallic member 17, so that the metallic member 17 remains around the inner portion of the mounting hole 15. This allows the negative terminal 12 and the metallic member 17 which are the mutually similar metals to be contacted and joined together, when the negative terminal 12 is inserted into the negative terminal fixing hole 23 and fixed by resistance welding or the like.

Figure 1E:
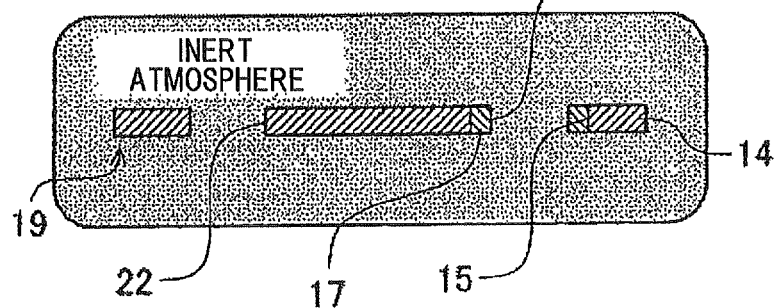
Figure 2:
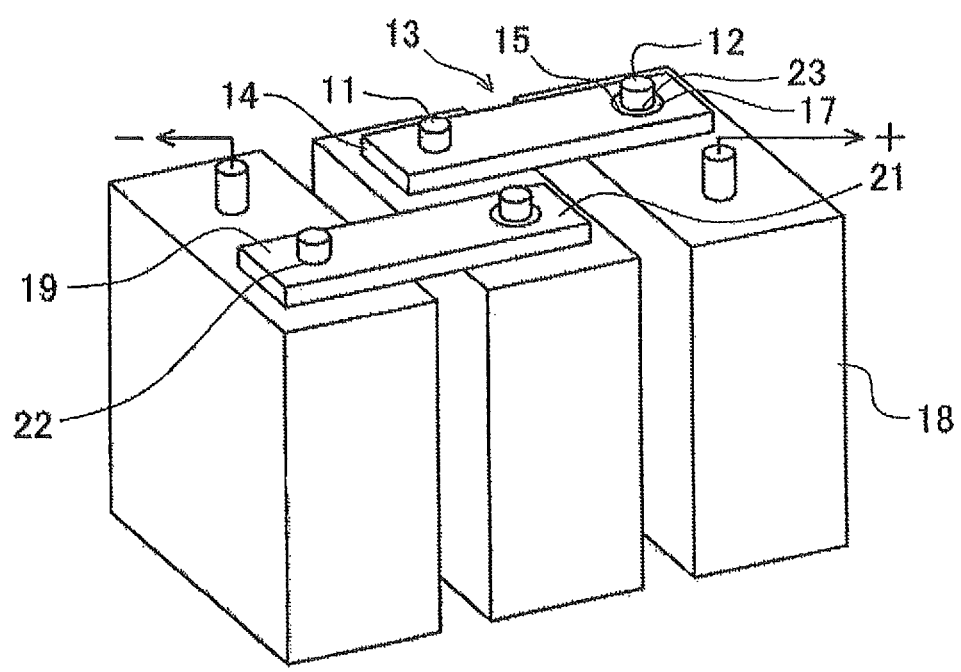
FIG. 2 is a perspective view showing a battery system in which a plurality of non-aqueous electrolyte secondary batteries are connected in series via an electrode terminal connector produced by use of the electrode terminal connector producing method according to the invention.

Also, the electrode terminal connector producing method in this embodiment preferably further comprises the step of after joining the first plate 14 and the metallic member 17 together, heating under an inert atmosphere (see FIG. 1E). This allows the diffusion bonding of the aluminum or aluminum alloy of the first plate 14 and the copper or copper alloy of the metallic member 17 to sufficiently proceed, thereby enhancing the joint strength therebetween.

As the inert atmosphere, a helium gas atmosphere or argon gas atmosphere may be used. Also, the heating temperature is set at a temperature of not higher than melting points of the parent materials, first plate 14 and metallic member 17.

When the non-aqueous electrolyte secondary batteries 18 are connected in series and parallel via the electrode terminal connector 13 resulting from the steps above, the positive and negative terminals 11 and 12 are electrically connected together by fixing, such as resistance welding or the like, the positive terminal fixing hole 22 of the electrode terminal connector 13 and the positive terminal 11 of one of the non-aqueous electrolyte secondary batteries 18 together, while fixing, such as resistance welding or the like, the negative terminal fixing hole 23 of the electrode terminal connector 13 and the negative terminal 12 of the other of non-aqueous electrolyte secondary batteries 18 together.

At this point, the positive terminal fixing hole 22 contacted with the positive terminal 11 is formed of the first plate 14 which is the similar metal to the positive terminal 11 and also the inner surface of the negative terminal fixing hole 23 contacted with the negative terminal 12 is covered with the metallic member 17 which is the similar metal to the negative terminal 12. Therefore, the similar metals are joined together, and can, in principle, prevent corrosion and resistance increasing due to the local battery effect.

Also, joining the similar metals together allows for employing convenient resistance welding or the like as the way to join the metals together.

In the electrode terminal connector producing method described so far, the steps from the formation of the mounting hole 15 until the joining of the metallic member 17 are performed by pressing which is excellent in working speed and which can be implemented using small-scale equipment, in comparison with hydrostatic extrusion. Therefore, no large-scale equipment is required, and the time to perform the steps from the formation of the mounting hole 15 until the joining of the metallic member 17 can be shortened.

Also, with the electrode terminal connector producing method, the working speed to perform the steps from the formation of the mounting hole 15 until the joining of the metallic member 17 is fast, in comparison with when hydrostatic extrusion and cutting are used in combination. It is therefore possible to suppress oxide film growth during working.

Further, with the electrode terminal connector producing method in the first embodiment, the metallic member 17 is inserted in the mounting hole 15 by press fitting to join the first plate 14 and the metallic member 17 together. Therefore, even if a little oxide film forms around the inner surface of the mounting hole 15, the oxide film can be destroyed immediately before the joining, and the aluminum or aluminum alloy of the mounting hole 15 and the copper or copper alloy of the metallic member 17 are bonded together by diffusion, thus resulting in a sufficient joint strength between the dissimilar metals, aluminum or aluminum alloy of the first plate 14 and copper or copper alloy of the metallic member 17.

Incidentally, the invention is not limited to the first embodiment, but various modifications may be made without departing from the spirit and scope of the invention.

(Variation)

In the first embodiment, the first plate 14 is formed of aluminum or an aluminum alloy which is the similar metal to the positive terminal 11 while the second plate is formed of copper or a copper alloy which is the similar metal to the negative terminal 12.

In the variation, the first plate 14 may be formed of copper or a copper alloy which is the similar metal to the negative terminal 12 while the second plate may be formed of aluminum or an aluminum alloy which is the similar metal to the positive terminal 11.

Referring again to FIGS. 1A to 1E, 19 may be provided as a negative terminal connecting portion to be electrically connected with the negative terminal 12 and 21 may be provided as a positive terminal connecting portion to be electrically connected with the positive terminal 11. 22 may be provided as a negative terminal fixing hole for the negative terminal 12, while 23 may be provided as a positive terminal fixing hole for the positive terminal 11.

Even in the variation, when the metallic member 17 is inserted in the mounting hole 15 by press fitting to join the first plate 14 and the metallic member 17 together, even if an oxide film forms around the surface of the metallic member 17, the oxide film is destroyed by the mounting hole 15 widening, and new surface creation is furthered, resulting in a sufficient joint strength between the dissimilar metals, copper or copper alloy of the first plate 14 and aluminum or aluminum alloy of the metallic member 17.

Second Embodiment

As shown in FIGS. 2 and 3A to 3E, an electrode terminal connector producing method in this embodiment is a method for producing an electrode terminal connector 13 for electrically connecting together a positive terminal 11 and a negative terminal 12 formed of mutually dissimilar metals. The method in the second embodiment is similar to the method in the first embodiment except that the method in the second embodiment further comprises the step of providing the metallic member 17 with an intervening layer 16 comprising a metal having an ionization tendency between an ionization tendency of a metal constituting the first plate 14 and an ionization tendency of a metal constituting the second plate; and inserting the metallic member 17 into the mounting hole 15 by press fitting to join the first plate 14 and the metallic member 17 together via the intervening layer 16 as a boundary. Accordingly, the same reference numerals as the first embodiment indicates the same parts as the first embodiment and the detailed explanation thereof is omitted for avoiding redundancy.

The method in the second embodiment comprises the steps of: pressing a first plate 14 formed of a similar metal to the positive terminal 11 to form a mounting hole 15 in the first plate 14; pressing a second plate (not shown) formed of a similar metal to the negative terminal 12 to form a metallic member 17 which is larger in diameter than the mounting hole 15; providing the metallic member 17 with an intervening layer 16 comprising a metal having an ionization tendency between an ionization tendency of a metal constituting the first plate 14 and an ionization tendency of a metal constituting the second plate before joining the first plate 14 and the metallic member 17; and inserting the metallic member 17 into the mounting hole 15 by press fitting to join the first plate 14 and the metallic member 17 together via the intervening layer 16 as a boundary, wherein the steps are continuously performed by a pressing device.

Here, each of the steps is specifically described.

Figure 3A:
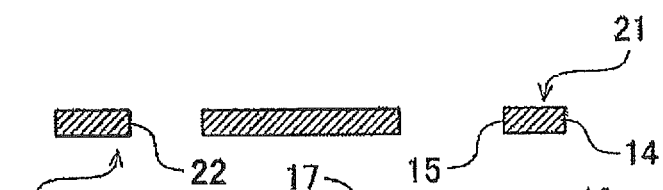
FIGS. 3A to 3E are explanatory diagrams showing an electrode terminal connector producing method in the second embodiment according to the invention.

In the step of pressing the first plate 14 formed of a similar metal to the positive terminal 11 to form the mounting hole 15 in the first plate 14, the first plate 14 formed of aluminum or an aluminum alloy is pressed (especially, punched) to form the mounting hole 15, and form the positive terminal fixing hole 22, resulting in the positive terminal connecting portion 19 (see FIG. 3A). Immediately after this step, no oxide film is formed around an inner surface of the mounting hole 15.

In the step of pressing the second plate formed of a similar metal to the negative terminal 12 to form the metallic member 17 which is larger in diameter than the mounting hole 15, the second plate formed of copper or a copper alloy is pressed (esp. punched) to form the metallic member 17.

The second plate is previously (i.e. prior to joining the metallic member 17 to the first plate 14) integrated as one piece with a third plate (not shown) to be provided as the intervening layer 16 later. Since a total thickness of the second plate and the third is substantially the same in thickness as the first plate 14, the total thickness of the metallic member 17 including the intervening layer 16 is also substantially the same as the thickness of the first plate 14.

The third plate is formed of the metal having the ionization tendency between the ionization tendency of the metal constituting the first plate 14 and the ionization tendency of the metal constituting the second plate, e.g., nickel, chrome, zinc or the like.

In the second embodiment, the metal constituting the third plate is selected in accordance with the ionization tendency. Other than the ionization tendency, a metal having a standard electrode potential between (i.e. an intermediate value of) a standard electrode potential of a metal constituting the first plate 14 and a standard electrode potential of a metal constituting the second plate may be selected as the metal constituting the third plate. It is because that the ionization series representing the ionization tendency coincides with the electrochemical series representing the standard electrode potential using hydrogen as a standard electrode.

The integration of the second plate and the third plate is preferably performed by clad bonding the third plate to the second plate.

A layer corresponding to the third plate may be formed by performing the plating process on the second plate. However, the intervening layer 6 should have a certain thickness. Therefore, it is easier and more convenient to perform the clad bonding of the third plate having the required thickness than to provide the plating layer with the required thickness by plating process.

The reason for providing the intervening layer 16 with the certain thickness is as follows. When the metallic member 17 is inserted into the mounting hole 15 by press fitting as described later, the intervening layer 16 will be scraped or ground. At this time, the intervening layer 16 should have the certain thickness such that the intervening layer 16 will not be removed completely by scraping or grinding.

Here, since the second plate and the third plate are integrated as one piece by clad bonding, the second plate and the third plate are joined together very strongly in metallurgical manner. In other words, the corrosion and resistance increasing due to the local battery effect hardly occurs between the second plate and the third plate.

Figure 3B:
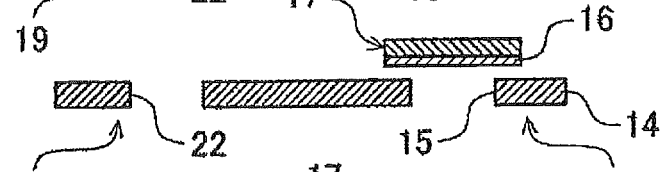
Figure 3C:
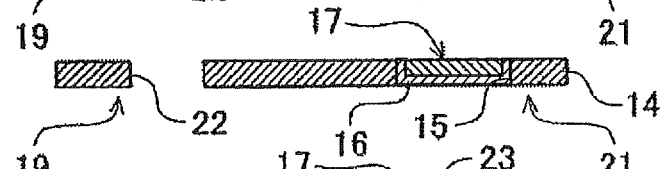
Figure 3D:
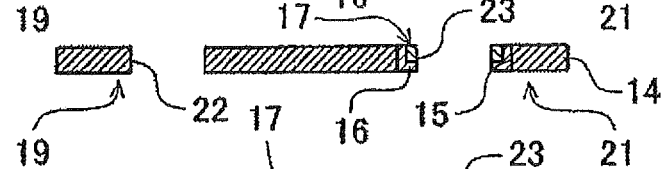

In the step of inserting the metallic member 17 into the mounting hole 15 by press fitting or indentation to join the first plate 14 and the metallic member 17 together via the intervening layer 16 as a boundary, the metallic member 17 is press fitted in the mounting hole 15 by punching of the pressing device (see FIGS. 3B and 3C).

At this point, the metallic member 17 is inserted into the mounting hole 15 by press fitting such that an inner surface of the mounting hole 15 and the intervening layer 16 of the metallic member 17 contact with each other, so that the intervening layer 16 and the mounting hole 15 mutually scrape or grind while plastically deforming, thereby the metallic member 17 is pressed into the mounting hole 15. Consequently, even if a little oxide film forms around the inner surface of the mounting hole 15, the oxide film is destroyed immediately before the joining, and new surface creation is furthered, resulting in diffusion bonding of the aluminum or aluminum alloy of the first plate 14 and the metal of the intervening layer 16.

This results in joining together of the dissimilar metals, aluminum or aluminum alloy of the first plate 14 and the metal of the intervening layer 16. This joining is the diffusion bonding with the two different metal surfaces metallurgically integral together in a solid phase state, therefore allowing enhancement of joining reliability and prevention of corrosion and resistance increasing due to the local battery effect.

The steps are followed by pressing (especially, punching) of the metallic member 17 joined into the mounting hole 14 to form the negative terminal fixing hole 23. It results in the negative terminal connecting portion 21 (see FIG. 3D).

At this point, the negative terminal fixing hole 23 is formed in a center region of the metallic member 17, so that the metallic member 17 remains around the inner portion of the mounting hole 15. This allows the negative terminal 12 and the metallic member 17 which are the mutually similar metals to be contacted and joined together, when the negative terminal 12 is inserted into the negative terminal fixing hole 23 and fixed by resistance welding or the like.

Further, at the step of forming the negative terminal fixing hole 23, it is preferable that the intervening layer 16 is not exposed at the inner surface of the negative terminal fixing hole 23 which contacts with the negative terminal 12, in order to avoid the joint between the dissimilar metals. Although it is not clearly shown in FIG. 3D, it is possible to cover the inner surface of the intervening layer 16 with a portion of the metallic member 17 by utilizing the ductility of the metal constituting the metallic member 17 when forming the negative terminal fixing hole 23.

Figure 3E:
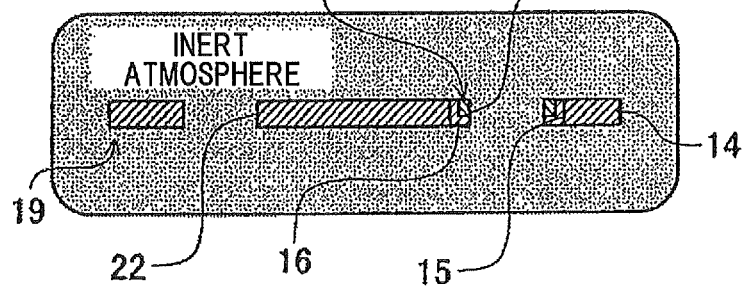

Also, the electrode terminal connector producing method in this embodiment preferably further comprises the step of, after joining the first plate 14 and the metallic member 17 together, heating under an inert atmosphere (see FIG. 3E). This allows the diffusion bonding of the aluminum or aluminum alloy of the first plate 14 and the metal of the intervening layer 16 to sufficiently proceed, thereby enhancing the joint strength therebetween.

As the inert atmosphere, a helium gas atmosphere or argon gas atmosphere may be used. Also, the heating temperature is set at a temperature of not higher than melting points of the parent materials, first plate 14 and intervening layer 16.

According to the electrode terminal connector producing method in the second embodiment, the function and effect similar to those of the first embodiment can be achieved.

Further, with the electrode terminal connector producing method in the second embodiment, the metallic member 17 is inserted in the mounting hole 15 by press fitting to join the first plate 14 and the metallic member 17 together via the intervening layer 16 as a boundary. Therefore, even if a little oxide film forms around the inner surface of the mounting hole 15, the oxide film can be destroyed immediately before the joining, and the aluminum or aluminum alloy of the mounting hole 15 and the metal of the intervening layer 16 are bonded together by diffusion, thus resulting in a sufficient joint strength between the dissimilar metals, aluminum or aluminum alloy of the first plate 14 and the metal of the intervening layer 16.

Further, since the second plate and the third plate are previously strongly joined by clad bonding, a sufficient joint strength between the dissimilar metals, i.e., the copper or copper alloy of the second plate and the metal of the intervening layer 16 is securely provided.

Still further, the aluminum or aluminum alloy of the first plate 14 and the copper or copper alloy of the second plate are joined together via the intervening layer 16 formed of nickel or the like having the ionization tendency between (i.e. at the intermediate point of) the metal of the first plate 14 and the metal of the second plate, thus relaxing the variation in ionization tendency at the bonded interface, thereby a potential difference in standard electrode potential at the bonded interface. As a result, it is possible to achieve the state that the corrosion and resistance increasing due to the local battery effect hardly occurs.

Incidentally, the invention is not limited to the second embodiment, but various modifications may be made without departing from the spirit and scope of the invention.

(Variation)

In the second embodiment, the first plate 14 is formed of aluminum or an aluminum alloy which is the similar metal to the positive terminal 11 while the second plate is formed of copper or a copper alloy which is the similar metal to the negative terminal 12.

In the variation, the first plate 14 may be formed of copper or a copper alloy which is the similar metal to the negative terminal 12 while the second plate may be formed of aluminum or an aluminum alloy which is the similar metal to the positive terminal 11.

Referring again to FIGS. 3A to 3E, 19 may be provided as a negative terminal connecting portion to be electrically connected with the negative terminal 12 and 21 may be provided as a positive terminal connecting portion to be electrically connected with the positive terminal 11. 22 may be provided as a negative terminal fixing hole for the negative terminal 12, while 23 may be provided as a positive terminal fixing hole for the positive terminal 11.

Even in the variation, when the metallic member 17 is inserted in the mounting hole 15 by press fitting to join the first plate 14 and the metallic member 17 together via the intervening layer 16 as the boundary, even if a little oxide film forms around the surface of the intervening layer 16 of the metallic member 17, the oxide film is destroyed by the mounting hole 15 widening, and new surface creation is furthered, resulting in a sufficient joint strength between the dissimilar metals, copper or copper alloy of the first plate 14 and the metal (e.g. nickel) of the intervening layer 16.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A method for producing an electrode terminal connector for electrically connecting together a positive terminal and a negative terminal formed of mutually dissimilar metals respectively, the method comprising:

pressing a first plate formed of a metal common to the positive terminal to form a mounting hole completely through a thickness of the first plate;

pressing a second plate formed of a metal common to the negative terminal and clad bonded with a third plate having an ionization tendency or standard electrode potential between respective-ionization tendencies or standard electrode potentials of the first plate and the second plate to form a metallic member being made of the second plate clad bonded with the third plate and being larger in diameter than the mounting hole;

press fitting the metallic member into the mounting hole in such a manner as to bring the third plate into contact with an inner circumferential surface of the mounting hole to join the first plate and the metallic member together; and forming a negative terminal fixing hole through a middle of the metallic member in such a manner as to leave the metallic member around the inner circumferential surface of the mounting hole, wherein the pressing the first plate, the pressing the second plate, the press fitting the metallic member, and the forming the negative terminal fixing hole are continuously performed by a pressing device to produce the electrode terminal connector for electrically connecting together the positive terminal and the negative terminal.

2. The method according to claim 1, further comprising:
providing the metallic member with the third plate,
wherein the first plate and the metallic member are joined together via the third plate as a boundary.

3. The method according to claim 1, further comprising:
after joining the first plate and the metallic member together, heating under an inert atmosphere.

4. The method according to claim 1, further comprising:
pressing the first plate to form a positive terminal fixing hole therein; and
pressing a center region of the metallic member to form the negative terminal fixing hole therein.

5. The method according to claim 1, wherein the pressing of the first plate comprises forming the mounting hole completely through the first plate.

6. The method according to claim 1, wherein a total thickness of the second plate and the third plate is substantially the same as the thickness of the first plate.

7. The method according to claim 1, wherein a total thickness of the metallic member including the third plate is substantially the same as the thickness of the first plate.

8. The method according to claim 1, further comprising clad bonding the second plate with the third plate to integrate the second plate as one piece with the third plate.

9. The method according to claim 1, wherein the third plate has the ionization tendency between the respective ionization tendencies of the first plate and the second plate.

10. The method according to claim 1, wherein, in the press fitting of the metallic member into the mounting hole, the metallic member is press fitted in the mounting hole by punching of the pressing device.

11. The method according to claim 1, wherein, in the press fitting of the metallic member into the mounting hole, the first plate and the third layer are diffusion bonded with respective different metal surfaces being integral together in a solid phase state.

12. The method according to claim 1, wherein, in the forming of the negative terminal fixing hole, the third layer is not exposed at an inner surface of the negative terminal fixing hole which contacts with the negative terminal.

13. The method according to claim 1, wherein the first plate comprises aluminum or an aluminum alloy, the second plate comprises copper or a copper alloy, and the third layer comprises nickel.

14. The method according to claim 1, wherein the pressing of the first plate further comprises pressing the first plate to form a positive terminal fixing hole.

15. The method according to claim 1, wherein, in the press fitting of the metallic member into the mounting hole, the metallic member and the mounting hole contact with each other so that surfaces of the metallic member and the mounting hole mutually scrape or grind while plastically deforming to press the metallic member into the mounting hole.

16. The method according to claim 1, wherein the forming of the negative terminal fixing hole comprises punching the metallic member joined into the mounting hole to form the negative terminal fixing hole.

\* \* \* \* \*